United States Patent

Bosse

[15] 3,694,888
[45] Oct. 3, 1972

[54] INSERT DRIVER DEVICE

[72] Inventor: Robert W. Bosse, Englewood Cliffs, N.J.

[73] Assignee: Groov-Pin Corporation, Ridgefield, N.J.

[22] Filed: Oct. 22, 1970

[21] Appl. No.: 82,999

[52] U.S. Cl. ................. 29/240, 10/155 R, 144/32
[51] Int. Cl. ........................................ B23p 19/06
[58] Field of Search ....... 10/155 R, 155 A; 29/208 D, 29/240; 144/32

[56] References Cited

UNITED STATES PATENTS 3,245,137  4/1966  Neuschotz .................. 29/240
3,333,613  8/1967  Bosse .................. 10/155 R X

*Primary Examiner*—Andrew R. Juhasz
*Assistant Examiner*—Gary L. Smith
*Attorney*—Arthur B. Colvin

[57] ABSTRACT

A device for automatically applying inserts into wood, plastic, aluminum or other relatively soft material, comprising a motor driving a rod threaded at its outer end to receive an insert, the rod extending through a hollow member against the end of which an end of the insert is adapted to abut, frictionally to lock the rod and the hollow member together, means being provided to permit simultaneous rotation of the rod and the hollow member when the insert is being applied, and to restrain rotation of the hollow member when the rod is reversed for removal from the insert.

10 Claims, 4 Drawing Figures

INSERT DRIVER DEVICE

This invention relates to an insert driver device, and more particularly to a device for automatically applying inserts into wood, plastic, aluminum or other relatively soft material.

As is well known, an insert generally comprises an annular metallic member of steel for example, having internal and external threads. Where it is desired to thread a bolt or screw into a workpiece of relatively soft material, it is known practice to first thread a metallic insert into an aperture formed therein so that the insert will receive the screw, rather than threading the screw into the material itself, thus avoiding the necessity for stressing the threaded portions of the relatively soft workpiece and avoiding the likelihood of stripping such threads.

Where a tool, such as a rod having a threaded end on which the insert is positioned, is used to drive the insert into the workpiece and the rod is rotated in reverse direction for removal from the workpiece, if the reverse torque applied by the rod to the insert is greater than the frictional hold of the material of the workpiece on the insert, the insert will also be withdrawn from the work.

It is accordingly among the objects of the invention to provide a device for automatically driving inserts of the type described, into a workpiece with assurance that the device may be removed from the insert after it is fully driven without withdrawal of the insert from the workpiece.

Another object is to provide a device of the above type which dependably restrains the rotation of the insert while the member that initially drove the insert into the workpiece is being removed from the insert.

According to the invention these objects are accomplished by the arrangement and combination of elements hereinafter described and more particularly recited in the claims.

In the accompanying drawings in which are shown one of various possible embodiments of the several features of the invention;

Figure 1:
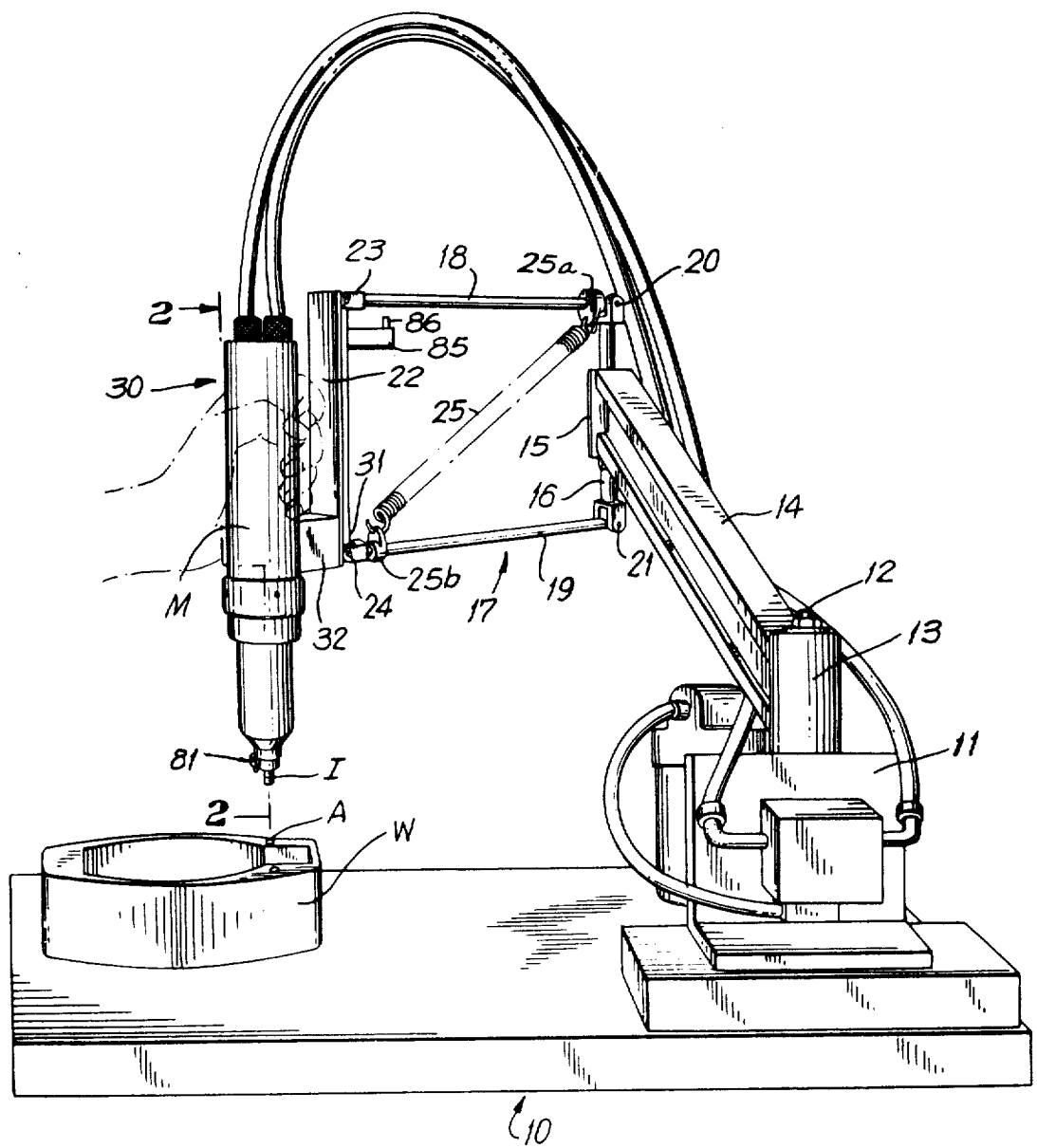
FIG. 1 is a perspective view of an automatic insert driver assembly.

Referring now to the drawing, as shown in FIG. 1 the insert driver device comprises a support base 10 to which is fixedly mounted a support member 11 carrying a swivel post 12. Pivotally mounted on post 12 by means of a hub 13 is an upwardly inclined extension leg 14 which may be moved in a horizontal plane. The leg 14 mounts a vertical boss 15 at its free end, which has an interior bushing within which is rotatably mounted a vertically directed support arm 16 of a frame 17 generally in the form of a pantograph.

The pantograph frame is defined, in addition to the arm 16, by parallel spaced reach arms 18, 19, pivotally connected to the arm 16 at spaced points 20, 21. A motor support arm 22 is provided with pivotal connections 23, 24 spaced apart to correspond with the spacing of pivots 20, 21, the arm 18 being connected to the pivot 23 and the arm 19 to the pivot 24.

As will be readily understood, the frame 17 may be articulated upwardly and downwardly, and in all articulated positions, the motor support arm 22 will remain parallel to the arm 16.

A counterbalance spring 25 is tensioned between the reach arms 18 and 19, the spring 25 being directed downwardly and forwardly, serving to counterbalance the weight of the motor assembly, next to be described, which is carried on the motor support art 21.

Optionally, but preferably, the spring 25 at its opposite ends, is connected to adjustable collars 25a, 25b, respectively, which collars may be slid longitudinally of the reach arms 18, 19, thus, to supply a variable counterbalancing force. Lock means, not shown, may be employed to fix the collars 25a, 25b, at any desired position along the reach arms.

A driver motor assembly 30 is carried by the motor support arm 22 adjacent the lower end 31 thereof.

The assembly 30 includes a bracket arm 32 secured to the lower end of arm 22 and extending laterally outward therefrom. The outer end of bracket arm 32 is secured to the casing of a drive motor M to support the latter in vertical position. Preferably, the motor M is of the reversible, air driven type, such as the motor manufactured by the Ingersoll-Rand Corporation. The operation of the air motor M forms no part of the present invention and it is to be understood that any suitable air motor, hydraulic motor or electric motor could be used which are reversible in their operation.

Figure 2:
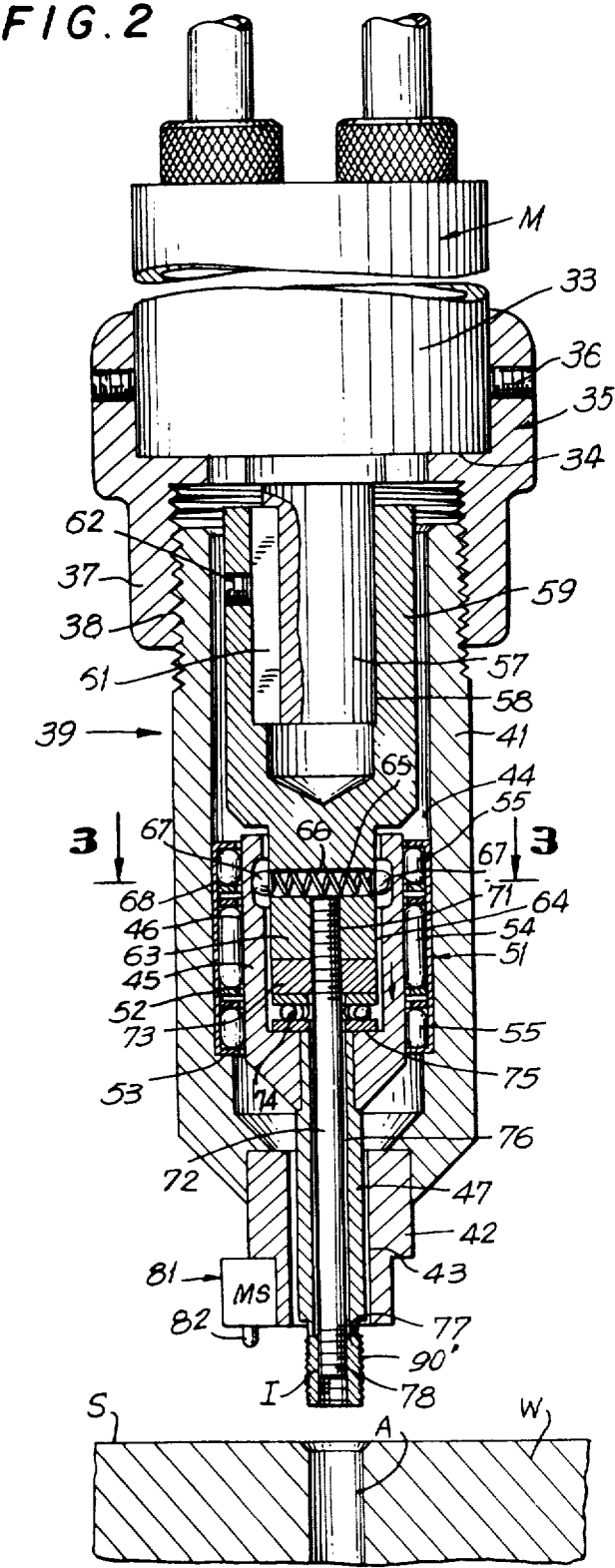
FIG. 2 is a sectional view on an enlarged scale taken along line 2—2 of FIG. 1.

As is clearly shown in FIGS. 1 and 2, the lower cylindrical end 33 of the motor M is positioned so as to seat on the annular shoulder 34 of a hollow coupling member 35, the end 33 being secured in place by set screws 36.

The lower end 37 of coupling member 35 is internally threaded as at 38 adjustably to mount a driver tool 39.

As shown in FIG. 2, the driver tool 39 comprises an outer casing 41 preferably having a cylindrical body portion, the upper end of which is externally threaded so that it may coact with the internally threaded portion 38 of coupling member 35.

The lower end of casing 41 mounts a nipple 42 having a bore 43 of smaller diameter than the bore 44 of casing 41 and axially aligned therewith.

Positioned in bore 44 is a cup-shaped driven member 45 having a cylindrical outer surface 46 and a reduced diameter stem 47 extending axially therefrom.

Encompassing the cylindrical body portion 46 of driven member 45 is a clutch and bearing assembly 51 illustratively of the type sold by the Torrington Company.

The assembly 51 comprises a cylindrical casing 52 which is secured by press fit into the bore 44, seating on an annular shoulder 53 formed in said bore near its lower end. The casing 52 contains a ring of rollers defining a clutch 54 and a pair of rings of roller bearings 55 which straddle the clutch 54.

As shown in FIG. 2, the motor M has a shaft 57 which extends into the bore 58 of a stud 59 extending axially in bore 44 of casing 41, the shaft 57 being locked in said bore 58 by a key 61 secured by set screw 62.

The stud 59 has a shank portion 63 which is of reduced diameter and which extends into the bore portion 64 of driver member 45.

Figure 3:
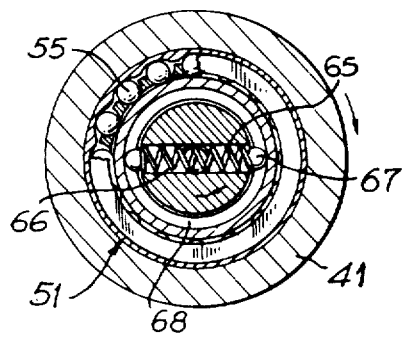
FIG. 3 is a transverse sectional view taken along line 3—3 of FIG. 2.

Means are provided releasably to lock the shank 63 in bore 64. To this end, as illustratively shown in FIGS. 2 and 3, the shank 63 has a bore 65 extending diametrically therethrough which accommodates a coil spring 66, the ends of which react respectively against balls 67 to urge the latter partially into an annular groove 68 formed in the inner surface of the bore 64.

The shank 63 has an axial bore 71 which is internally threaded to receive the correspondingly threaded end of a drive rod 72, the latter being locked in position by a lock nut 73. A thrust bearing 74 is desirably provided between the lock nut 73 and the annular shoulder 75 formed in driven member 45.

The drive rod 72 extends through the bore 76 of stem 47, and protrudes outwardly beyond the end 77 of said stem, as at 78, said protruding portion being threaded to receive an insert I as shown.

Mounted on the nipple 42 is a microswitch 81 which has a vertically directed plunger 82 designed to engage the top surface S of the workpiece W into which the insert I is to be driven. Actuation of the microswitch 81 will cause reversal of the air motor M in the manner hereinafter to be described.

In addition, a microswitch 85 is mounted on the motor support arm 22, being secured thereto in such position adjacent the upper reach arm 18 that the plunger 86 of the microswitch will engage the arm 18 upon upward movement of the arm 22 to a predetermined height. The actuation of the microswitch 85 will cause reversal of the air motor M to restore the latter to insert driving condition.

Figure 4:
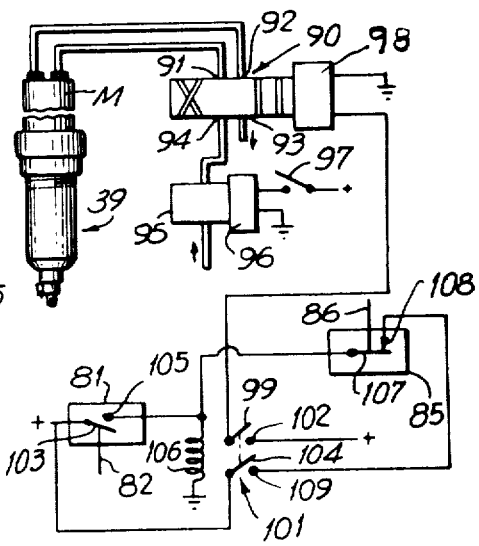
FIG. 4 is a schematic circuit of the control system for the driver assembly.

Although any suitable circuit may be utilized to effect the desired operation of the equipment, as illustratively shown in FIG. 4, a reversible air valve 90 is provided having control ports 91, 92 connected to the air motor M. The valve 90 has an outlet port 93 and a pressure port 94 connected through normally closed valve 95 to a source of gas under pressure. The solenoid 96 controlling valve 95 is connected to ground and through normally open switch 97 to a source of positive potential.

The valve 90 is normally spring urged to connect its ports 91, 94 and 92, 93 which is the drive position of the valve. The solenoid 98 controlling valve 90 is connected to ground and to the contact arm 99 of relay 101, the contact arm 99 normally being spaced from fixed contact 102 connected to positive potential.

The microswitch 81 has a contact arm 103, controlled by plunger 82, which is connected to positive potential and to contact arm 104 of relay 101. Contact arm 103 is normally spaced from fixed contact 105 connected to one end of the coil 106 of relay 101 and to the contact arm 107 of microswitch 85 controlled by plunger 86 and normally engaging fixed contact 108, the latter being connected to fixed contact 109 of relay 101.

In the operation of the equipment above described, when switch 97 is closed, the solenoid 96 will be energized to open valve 95 so that gas under pressure will flow through valve 90 to energize motor M to rotate the drive shaft 57 in drive direction. As a result stud 59 and drive rod 72 secured to the shank portion 63 thereof will also rotate.

The operator then positions an insert on the threaded end 78 of the rod 72 which is rotating clockwise or in insert driving direction. The insert I will ride up the threaded end 78 until the upper end 90' of the insert abuts against the lower end 77 of the stem 47 of the driven member 45. As a result of the frictional engagement of the end 90' of the insert I and the end 77 of stem 47, the driven member 45 will now rotate in a clockwise direction.

The clutch 54 is so positioned that the cylindrical portion 46 of the driven member 45 will not be restrained by the clutch so that the driven member 45 will rotate relative to the casing 41 with rotation of drive rod 72.

The operator will thereupon lower the insert into an aperture A in a workpiece W. This is accomplished, referring to FIG. 1, by the operator merely aligning the insert with the aperture A and pushing downwardly on the motor M.

The insert I will be progressively driven into the material of the workpiece W by the rotating drive rod 72 until the free end of plunger 82 engages the upper surface of the workpiece. Inward movement of the plunger 82 will cause contacts 103, 105 to engage completing a circuit to relay 101 so that the latter will be energized closing its contacts 99, 102 and 104, 109.

Closing of contacts 99, 102 will cause solenoid 98 to be energized thereby actuating valve 90 to connect ports 94, 92 and 91, 93 to reverse the direction of rotation of motor M.

As a result, the drive shaft 57 of motor M and the drive rod 72 will rotate in a counterclockwise direction.

The plunger 82 is so positioned with respect to the top of the workpiece W that the air motor M will be reversed as soon as the top 90' of the insert is flush with or slightly below the top surface of the workpiece.

Adjustment of the position of plunger 82 is readily accomplished by rotation of the casing 41 in coupling member 37, which causes longitudinal movement of the casing with respect to the driven member 45.

As soon as motor M is reversed so that the shaft 57 thereof and drive rod 72 rotates in a counterclockwise direction, due to the frictional engagement of end 77 of stem 47 of driven member 45 and the top 90 of insert I, the driven member 45 would also tend to rotate in a counterclockwise direction. If such rotation of the driven member did occur, due to the frictional engagement of end 77 of the stem 47 and the top 90' of the insert, the insert would tend to unscrew from the aperture A in the workpiece W and only the frictional engagement of the insert I in aperture A would hold it in place. However, where the workpiece is of relatively soft material such as aluminum, for example, the frictional engagement is relatively small and unscrewing of the insert would occur.

However, by reason of the one-way clutch 54, as soon as the driven member 45 starts to rotate in a counterclockwise direction, the clutch 54 will lock the cylindrical portion 46 of driven member with respect to the casing 41 so that no relative rotation will occur between the casing and the driven member 45.

Consequently, the upper end 90' of the insert I will remain locked in frictional engagement with the lower end 77 of stem 47 so that only the drive rod 72 will rotate in a counterclockwise direction. As a result, the threaded end 78 of the drive rod 72 will completely withdraw from the threaded bore of the insert with substantially no withdrawing torque being applied to the insert.

When the threaded end 78 of the drive rod 72 is completely withdrawn from the insert, at such time the driver tool will be completely separated from the insert and the plunger 82 of microswitch 81 will be fully extended.

Although the contacts 103, 105 of microswitch 81 will open, due to the holding contacts 104, 109, relay 101 will remain energized so that its contacts 99, 102 will remain closed. As a result, valve 90 will remain in reversing position and the motor M will still rotate in reverse condition until the operator lifts the motor support arm 22 sufficiently so that the plunger 86 of microswitch 85 engages reach arm 18 which opens the holding circuit of relay 101.

If not for the provision of such holding circuit, the motor M might reverse before the threaded end 78 of the drive rod 72 was completely clear of the insert so that complete separation of the driver tool from the insert could not be achieved.

With the equipment above described, an insert may be dependably driven into an aperture in a workpiece of even relatively soft material with assurance that upon rotation of the drive rod of the driver tool to remove it from the insert, no withdrawing torque will be applied to the insert which could cause it to emerge from the workpiece.

Having thus described my invention, what I claim as new and desire to secure by Letters Patent of the United States is:

1. A quick release driver tool for the application of a self-tapping screw mounting insert into an untapped bore in soft material, said tool comprising an outer casing, a driven member positioned in said casing and having a cylindrical portion with a stem extending axially therefrom, means coacting with the cylindrical portion of said driven member and the adjacent inner portion of said casing to permit free rotation of said driven member in one direction and restraining rotation thereof in the opposite direction, said driven member having an axial bore therethrough, a drive rod extending axially through the bore of said driven member and rotatably mounted therein, said drive rod having a threaded portion at its free end protruding beyond the end of the stem of said driven member, and means alternately to rotate said drive rod in opposite directions, whereby one end of an insert mounted on the threaded end of said drive rod will engage the end of said stem upon rotation of said drive rod in one direction to drive said insert into the workpiece while effecting tight frictional engagement between the said end of the insert and the end of said stem for free rotation of said driven member and upon rotation of said drive rod in the opposite direction for release of the threaded end thereof from the insert, said driven member will be restrained from rotation thereby restraining said insert from rotation.

2. The combination set forth in claim 1 in which the means coacting with the cylindrical portion of said driven member comprises an annular oneway clutch having its outer periphery secured to the inner wall surface of said casing and its inner periphery engaging said cylindrical portion.

3. The combination set forth in claim 2 in which a pair of annular bearings are positioned in said casing straddling said oneway clutch.

4. The combination set forth in claim 1 in which the bore of said driven member is of enlarged diameter at its inner end, a drive stud positioned in said casing has a shank positioned in the enlarged diameter portion of said bore, means to retain said shank in said bore while permitting relative rotation therebetween, the inner end of said drive rod being operatively connected to said shank and extending axially therefrom, and the means alternately to rotate said drive rod in opposite directions is operatively connected to said drive stud.

5. The combination set forth in claim 4 in which said shank has a transverse bore therethrough, a pair of balls are positioned in said bore adjacent the ends thereof, resilient means in said bore reacting against said balls to urge them outwardly, the bore of said driven member having an annular groove in its wall partially to receive said balls to lock said shank to said driven member.

6. The combination set forth in claim 4 in which said shank has a threaded axial bore and the inner end of said drive rod is externally threaded and screwed into said bore.

7. The combination set forth in claim 4 in which a reversible drive motor is mounted on one end of said casing, said motor having a drive shaft extending into said casing, said drive stud having an axial bore in its inner end to accommodate said drive shaft and means to lock said drive shaft to said stud.

8. The combination set forth in claim 1 in which depth sensing member is mounted on said casing adjacent the end thereof from which the stem of said driven member extends, and means controlled by said depth sensing member to reverse the direction of rotation of said drive rod when the insert has been driven thereby into the workpiece a predetermined amount.

9. The combination set forth in claim 8 in which means are provided to adjust the vertical position of said depth sensing member with respect to said stem.

10. The combination set forth in claim 4 in which the casing is externally threaded at one end, a coupling member having a bore therethrough internally threaded at one end is screwed on the threaded end of said casing, a reversible drive motor is mounted in the outer end of said coupling bore and secured to said coupling, said motor having a drive shaft extending through said coupling into said casing, said drive stud having an axial bore in its inner end to accommodate said drive shaft, means to lock said drive shaft to said stud, a depth sensing member mounted on said casing adjacent the end thereof from which the stem of said driven member extends, means controlled by said depth sensing member to reverse the direction of rotation of said drive shaft when the insert has been driven by said drive rod into the workpiece a predetermined amount.

* * * * *